No. 12,623. REISSUED MAR. 26, 1907.
A. BECKER.
DUMPING MECHANISM FOR METALLIC CARS.
APPLICATION FILED MAY 2, 1906.
3 SHEETS—SHEET 1.
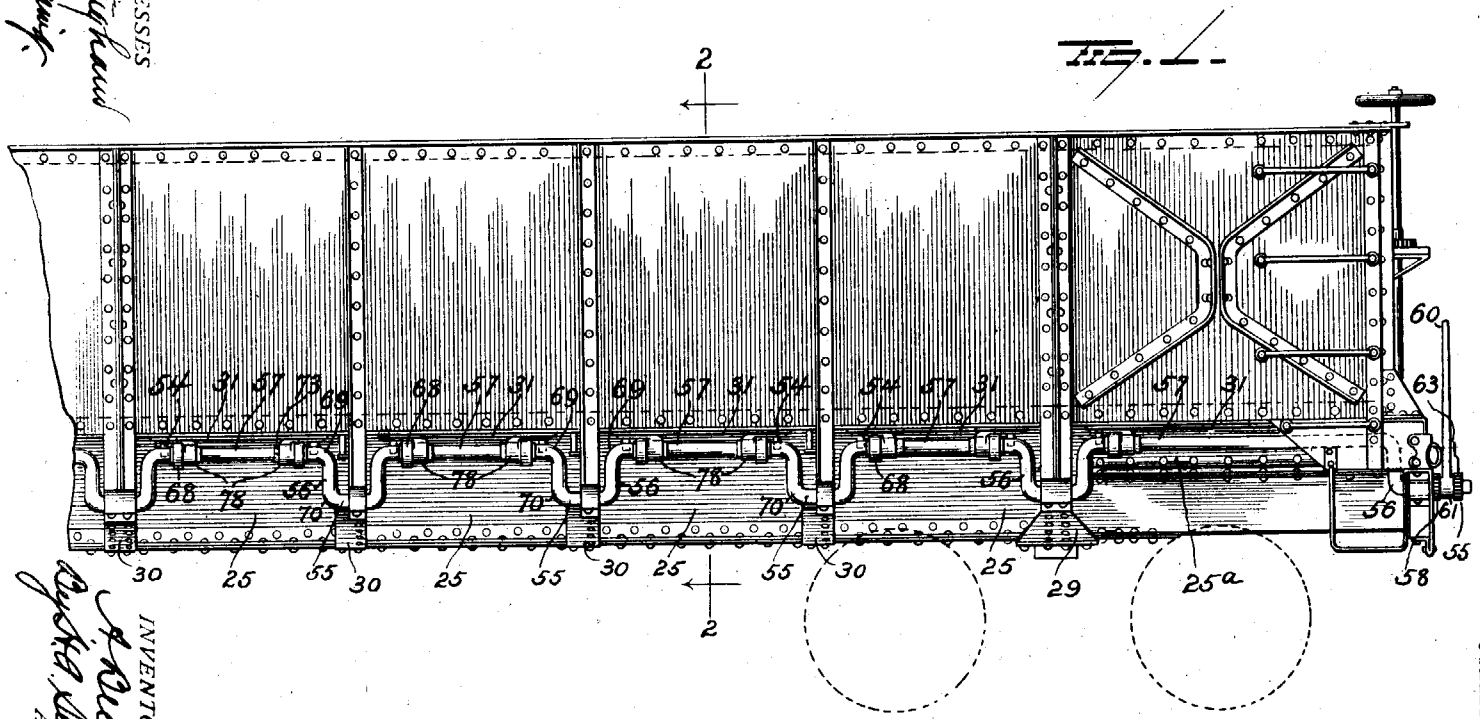
WITNESSES
E. L. Nottingham
G. F. Downing
INVENTOR
A. Becker
By H. A. Seymour
Attorney No. 12,623. REISSUED MAR. 26, 1907.
A. BECKER.
DUMPING MECHANISM FOR METALLIC CARS.
APPLICATION FILED MAY 2, 1906.
3 SHEETS—SHEET 2.
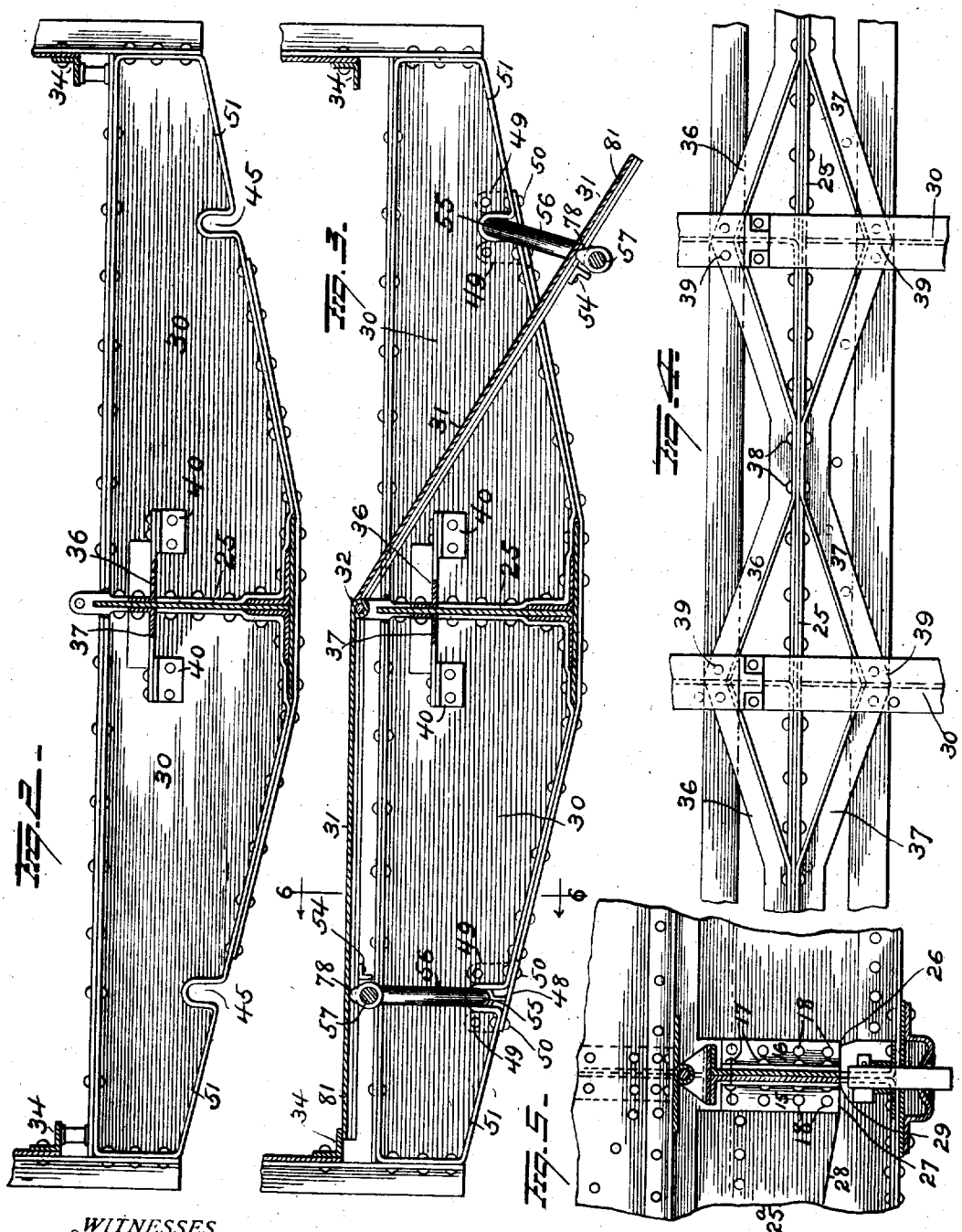
WITNESSES
E. L. Nottingham
G. F. Downing
INVENTOR
A. Becker
By H. A. Seymour
Attorney No. 12,623. REISSUED MAR. 26, 1907.

A. BECKER.

DUMPING MECHANISM FOR METALLIC CARS.

APPLICATION FILED MAY 2, 1906.

3 SHEETS—SHEET 3.

WITNESSES

E. J. Nottingham

G. F. Downing

INVENTOR

A. Becker

By H. A. Seymour

Attorney

UNITED STATES PATENT OFFICE.

ANTON BECKER, OF COLUMBUS, OHIO, ASSIGNOR, BY MESNE ASSIGNMENTS, TO THE RALSTON STEEL CAR COMPANY, OF EAST COLUMBUS, OHIO, A CORPORATION OF OHIO.

DUMPING MECHANISM FOR METALLIC CARS.

No. 12,623. Specification of Reissued Letters Patent. Reissued Mar. 26, 1907.

Original No. 763,841, dated June 28, 1904. Application for reissue filed May 2, 1906. Serial No. 314,900.

*To all whom it may concern:*

Be it known that I, ANTON BECKER, a citizen of the United States, residing at Columbus, in the county of Franklin and State of Ohio, have invented a new and useful Dumping Mechanism for Metallic Cars, of which the following is a specification in its best form now known to me, reference being had to the accompanying drawings, in which similar numerals indicate the same parts throughout the several views.

My invention relates to dumping mechanism for cars, and while it is particularly applicable for use in metallic cars and is so described it should be understood that it may also be applied to cars made of other materials.

In the specific form of my invention here described it is an improvement upon the devices shown and described in my application for metallic flush-floor dump-car, Serial No. 190,415, filed by me January 23, 1904, and for convenience that application and the drawings therein will be referred to at different points in the specification.

The object of my invention is to provide mechanism for operating the dumping-doors of the car which can be very easily and cheaply constructed and which will operate very efficiently and not be liable to easily get out of order.

My invention broadly consists in a crank-shaft having a crank-arm adapted to engage the doors, so that by merely revolving the shaft upon its axis in opposite directions the doors will be opened and closed.

It also consists in a novel stiffening device, which is rendered possible by the use of this preferred dumping mechanism, by which the car of my application Serial No. 190,415 is rendered more rigid.

My invention also consists in many details of construction, which will be hereinafter more fully described and claimed as the specification proceeds.

Figure 6:
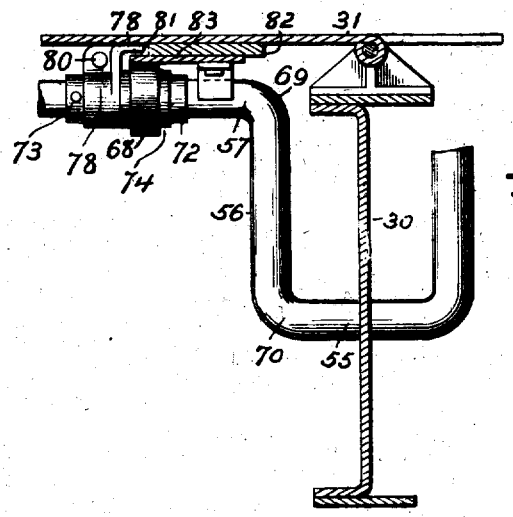
Figure 7:
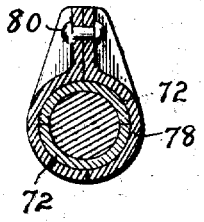
Figure 8:
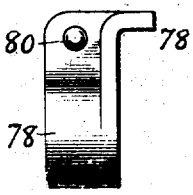
Figure 11:
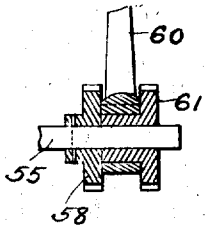
Figure 9:
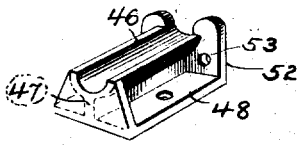
Figure 10:
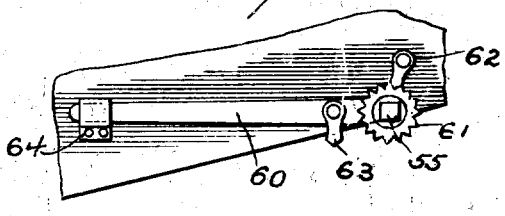

In the drawings, Figure 1 is a side elevation of the car embodying my invention in its preferred form. Fig. 2 is a sectional end view of the car, taken on line 2 of Fig. 1, showing a cross-bearer, the door-operating mechanism and doors being removed. Fig. 3 is the same view showing the doors, shafts, and operating crank-arms in position. Fig. 4 is a detail plan view showing the bracing for stiffening the central plate-girder of the car. Fig. 5 is a detail sectional elevation through the bolster, showing the central plate-girder made in two pieces secured together at the bolster. Fig. 6 is a detail sectional view on line 6 of Fig. 3, showing the details of the door-operating mechanism. Fig. 7 is a sectional end view, and Fig. 8 is a side view, of the tongue or finger which makes the sliding connection between the door-operating mechanism and the door itself. Fig. 9 is a detail perspective view of a casting used to form a bearing for the shaft. Fig. 10 is a detail end view of the ratchet mechanism for operating the shaft. Fig. 11 is a detail view of the ratchet-wheels on the end of the shaft.

As my former application fully describes the car in general and claims all of the important features except those here shown for the first time, I will only describe so much of the whole car as is necessary for a proper understanding of the new features.

As in the former application referred to, numeral 25 indicates the central plate-girder of the car cut away in the lines 26, 27, and 28, this girder differing from the plate shown in that application only in that instead of being made of one continuous piece of metal it is made in two or three pieces, one portion 25 extending from bolster to bolster and a supplemental portion 25ª extending in line with the main portion 25 from the bolster to the end sill, the two being secured together and to the bolster by angle-irons 15 and 16 and rivets 17 and 18. By this construction I am able if the car should be in a wreck and the portion of the plate-girder between the bolster and the end sill be bent or otherwise damaged to cut the rivets 17 and the connection (not shown in detail in this application) between portion 25ª and the end sill and remove the portion 25ª and substitute a new similar portion. By this construction I can make the bolster of one piece or pieces of metal running across the car from side to side.

As in my former application, the underframe of the car is made up of the central plate-girder 25, the bolsters 29, and a series of cross-bearers 30, running across the car at intervals and intersecting this central plate-girder at right angles. Similarly, as shown in my previous application, there are doors 31, pivoted at 32 at or near the top of the central plate-girder, adapted to occupy substantially all of the space between the cross-bearers or a cross-bearer and a bolster, and thus form a portion of the floor of the car, the door being held up against an angular stop 34. The door is also adapted to swing down from the horizontal position shown at the left of Fig. 3 to the inclined position shown at the right of Fig. 3, in which position the portion of the load which rests on the door when it is in the horizontal position will slide off at the side of the car, thereby unloading the portion of the car-load upon the particular door.

In order to stiffen the underframe of the car and make it more rigid than that shown in my former application, I take a series of angle-irons 36 and 37 and bend them, as shown in Fig. 4, and secure them together to the central plate-girder by means of rivets or bolts 38 and secure their ends 39 by means of angle-irons 40 to the adjacent cross-bearers or bolster, thereby providing a trusswork (shown in Fig. 4) which greatly stiffens the central plate-girder. This trusswork is, as shown, placed near the top of the girder, but low enough so that it will not impede the opening the door, as shown in Fig. 3.

While the invention of this application includes some of the details just referred to, it consists principally in novel means for opening and closing the doors 31, forming the floor of the car. In order to accomplish this, I cut in the opposite sides of each cross-bearer notches 45, as shown in Fig. 2. These may be literally cut out of the flanged plate forming the web of the cross-bearer, or they may be pressed into flange 51, as shown. The upper portion of these notches should be approximately semicircular, so as to fit around the shaft and allow it to bear therein. I then provide castings, as shown in Fig. 9, having semicircular bearing-faces 46, supported on the web 47 on a lower flange 48, these castings being adapted to slip into the notch 45 and to be secured in position by rivets 50, passing through the flange 48 of the castings and the flange 51 of the cross-bearer 30. In order to further secure these castings in position, I can, if desired, place thereon an end flange 52 and secure this flange 52 to the web of the cross-bearer 30 by means of bolts or rivets 49, passing through the hole 53 and through corresponding holes (not shown) in the cross-bearer.

Extending from end to end of the car and mounted in the bearing-surfaces 46 on the castings just described, secured within the notches 45 in the cross-bearer webs, is a shaft 55, having bent in it adjacent to each of the cross-bearers where it is pivoted double crank-arms 56, connected together by a long crank-pin 57, as shown in Fig. 1. In the particular form shown this crank-pin 57 is made of a single piece of shafting bent in the form shown; but manifestly it may be made of a forging or in other ways without departing from my invention. The crank-pins 57 should be approximately horizontal and approximately of the width between the cross-bearers and somewhat longer than the width of the doors 31, so that when the shaft is up, as shown in Fig. 1 and at the left of Fig. 3, the crank-pin will bear against the stop 54 on the under side of the door and hold it in a horizontal position and so that when the shaft is turned through an angle of approximately one hundred and eighty degrees to the position shown at the right in Fig. 3 the door will rest upon the crank-pin between the crank-arms. On the end of the shaft I rigidly secure two ratchet-wheels 58 and 61, and between them I journal a lever 60, having on its outside a pivoted universal pawl 63, adapted to engage the ratchet-wheel 61, which is made with universal teeth, so that the lever and pawl may operate upon it in either direction. Pivoted to the end sill of the car I mount another pawl 62, adapted to bear upon the ratchet-wheel 58, which also has universal teeth, so that it may operate in either direction, depending upon the angle of the pawl to the ratchet-wheel. In the operation of the shaft the operator takes hold of the lever 60 and moves it up and down off from the stop or rest 64, in which it normally reposes, and by placing the pawl 63 in proper relationship to the ratchet-wheel 61 moves the shaft 55 in one direction. At the same time the pawl 62 is placed in such a position that the ratchet-wheel 58 clicks under it and the pawl acts as a lock, preventing the shaft running away from the operator in the direction opposite to the direction from which he is attempting to turn the shaft. To by hand reverse the operation of the device, the operator has simply to reverse the angularity of the two pawls to their ratchet-wheels and move the lever 60 in the opposite direction from the direction he was previously moving it. When the door is closed in the position shown at the left of Fig. 3, the operator can by simply throwing both pawls 62 and 63 out of engagement with their respective ratchet-wheels take all the control of lever 60 off from the shaft, in which case in the absence of foreign obstructions, such as ice or wedged-in material, the load upon the door will force the door down and rotate the shaft to the position shown at the right of Fig. 3. If the doors always worked freely under the action of gravity and there was no friction between the crank-pins 57 and the doors, the doors could be operated by simply rotating the shaft 55 in opposite directions by means of the lever 60, as just described, and the doors would by gravity always fall; but in practice there is some friction between the crank-arm and the doors, and, furthermore, the doors may become frozen shut or stick for other causes. In order to make the rotation of the shaft positive under these conditions and with little friction, I provide special mechanism, which I shall now describe. This mechanism consists of an antifriction-wheel 68, which should be made with a hole in it large enough so that it will slip over the turns 69 between the crank-pin 57 and the crank-arm 56 and over the turns 70 between the crank-arm 56 and the shaft proper, 55. In order to fill up this space in the wheel and give it a proper bearing when in the desired position, I make a split collar 72 in two parts, as shown in Fig. 8, the two parts of the collar being adapted to slip inside of the wheel 68 and have the wheel rotate freely upon the collar in contact with the head of the collar 74. On the other side of the wheel 68 I journal a finger 78, made in two parts, as shown in Fig. 7, and secured together by rivet 80. This finger 78 rotates on the split collar 72, and the collar is secured to the shaft by a cotter 73. The end of finger 78 is adapted, as shown, to fit inside of the slot 81 in the door 31, the slot being formed by securing two plates 82 and 83 below the door, the plate 83 extending outside of the plate 82, this structure being similar to that shown in my previous application, in which the corresponding slot is numbered "92." The parts are so arranged and proportioned that, as shown in Fig. 6, when the finger 78 is in slot 81 the wheel 68 bears against the under side of the door, from which it will be seen that as shaft 55 rotates, thereby moving the crank-pin 57 in a semicircle about the center of the shaft, the finger 78 will move along the slot 81 in the doors and the wheel 68 will bear against the under side of the doors, and that by giving the shaft 55 a half-rotation it will move the floor-doors from the horizontal position to the inclined position shown in Fig. 3. By reversing the operation the motion of the doors will be reversed.

In the operation of my invention, assuming that the car-doors are in the position shown at the left of Fig. 3, the operator takes hold of the lever 60, and by the use of the pawl in proper position rotates the shaft 55 from the position shown at the left of Fig. 3 to the position shown at the right of the same figure, thereby lowering the door to such a position that the load upon it will slide off. When this is accomplished, he reverses the pawls and rotates the shaft in the opposite direction until the door again returns to the horizontal position. If at any time the shaft gets out of order and it is necessary to remove it, the operator cuts the rivets 49 and 50 along successive cross-bearers and removes the castings 46 48, supporting the shaft, and then removes the shaft and makes what repairs are necessary and replaces the same or a new shaft and rerivets the parts in position.

I do not wish to be understood as limiting myself to the exact details of construction, which may be varied within reasonable limits without departing from my invention.

Having thus described my invention, what I claim as new, and desire to secure by Letters Patent, is—

1. In a car, in combination with the frame of the car, a pivoted door adapted to retain a part of the load, a shaft adjacent to the door, a crank-arm on said shaft, a wheel on said crank-arm in engagement with said door, means for holding said wheel in contact with the door in all operative positions, and means for turning said shaft, whereby, as said shaft is moved, said door is opened or closed.

2. In a car, in combination with the frame of the car, a pivoted door adapted to retain a portion of the load, a shaft journaled adjacent to said door, a crank on said shaft, a journaled wheel on said crank-arm adapted to bear against the door, and mechanism on the crank-arm sliding in a slot in the door and means for turning the shaft, whereby moving the shaft in opposite directions gives the door corresponding motion.

3. In a car, in combination with the frame of the car, a pivoted door adapted to retain a portion of the load a shaft journaled on opposite sides of said door, double crank-arms between the bearings of said shaft having a common crank-pin, a wheel or wheels on said crank-pin bearing against said door, means for holding said wheel in contact with the door in all operative positions, and means for turning said shaft, whereby, as said shaft is moved, said door is moved.

4. In a car, in combination with the frame of the car, a pivoted door adapted to retain a portion of the load, a shaft pivotally mounted adjacent to the door and on opposite sides of it, double crank-arms between the bearings of said shaft having their crank-pin bearing against and supporting said door and mechanism on said pin in engagement with a slot in said door, whereby as said shaft is revolved in opposite directions, it moves the door positively in opposite directions.

5. In a car, in combination with the frame of the car, a pivoted door adapted to retain a portion of the load, a shaft journaled adjacent to the door and on opposite sides thereof, double crank-arms on said shaft and a pin connecting them adapted to support said door, a wheel upon the crank-arm bearing against the under side of the door and mechanism mounted on the crank-pin moving in a slot in the door and mechanism for moving said shaft, whereby as the shaft is moved in opposite directions, the door is positively moved in opposite directions.

6. In a car, the combination of the frame of the car consisting of a center plate-girder and cross-bearers or bolsters, doors pivoted to the center girders adapted to swing up and form a portion of the floor of the car and adapted to swing down between the cross-supports, a shaft pivotally mounted at a fixed point on the cross-supports and a crank-arm on said shaft bearing against the under side of each of the doors, adapted, as said shaft is moved, to open and close the doors.

7. In a car the combination of a frame of a car, consisting of a center girder and cross-bearers or bolsters, doors pivoted to the center girder adapted to swing up and form a portion of the floor of the car and adapted to swing down between the cross-supports, a shaft pivotally mounted at a fixed point on the cross-supports, a crank-arm on said shaft and a wheel on said crank-arm bearing against the under side of the doors.

8. In a car, the combination of the frame of the car consisting of a center plate-girder and cross-bearers or bolsters, doors pivoted to the center plate-girder adapted to swing up and form a portion of the floor and adapted to swing down between the cross-supports to empty the load from the doors, a shaft pivotally mounted on the cross-supports, a portion of the shaft being bent to form double crank-arms, each crank-arm, bearing against and supporting the door above it and means for turning the said shaft, whereby, as said shaft is turned in opposite directions, said doors are positively moved up and down.

9. In a metallic car, a shaft having one or more crank-arms with connecting-pins in it, an antifriction-wheel having a hole in its center large enough to allow it to slip along said shaft over said crank-arms onto said crank-pin, and a split sleeve adapted to fit over said crank-pin to form a journal-bearing for said antifriction-wheel.

10. In a metallic car, a shaft having one or more double crank-arms and a connecting crank-pin bent in it, an antifriction-wheel having a hole in its center large enough to allow it to slip along said shaft over said crank-arms onto said crank-pin, a split sleeve adapted to fit over said crank-pin to form a journal-bearing for said antifriction-wheel and a finger rotatably mounted upon said sleeve adapted to engage a slot in a door.

11. In a car, a cross-bearer or bolster having a notch in its lower edge, a casting forming the lower portion of the bearing for a shaft adapted to fit into said notch and means for securing said casting to said cross-bearer or bolster.

12. In a car, a cross-bearer or bolster having a notch in its lower edge, a member adapted to act as a lower bearing for a shaft closing the bottom of said notch, and means for securing said member to said cross-bearer or bolster.

13. In a car, a cross-bearer or bolster made in the form of a plate-girder with a lower flange, a notch cut in the lower edge of said bolster adapted to form the top bearing for a shaft, a casting adapted to form the lower bearing for a shaft adapted to fit in said notch and means for securing said casting to the flange of said cross-bearer or bolster.

14. In a metallic car a frame consisting of a central plate-girder and cross-bearers or bolsters intersecting the same at right angles, a door pivoted to said central plate-girder between one set of cross-bearers or bolsters, adapted when level, to form a portion of the floor of the car, and adapted when swung down, to permit the portion of the load upon the door to slide off at the side of the car, means for moving said door from one position to the other and horizontal truss-bracing near the top of said plate-girder but low enough to permit said opening and closing of the door connected to opposite cross-bearers or bolsters, substantially as described.

15. In a car, in combination with the frame of the car, a pivoted door adapted to retain a portion of the load, a shaft pivotally mounted adjacent to the door and on opposite sides of it, double crank-arms between the bearings of said shaft having their crank-pin bearing against and supporting said door in both open and closed positions, and means for operating the shaft to open and close the door.

16. In a car, in combination with the frame of the car, a pivoted door adapted to retain a portion of the load, a shaft journaled adjacent to the door and on opposite sides thereof, double crank-arms on said shaft and a pin connecting them adapted to support said door in both open and closed positions, a wheel upon the crank-arm bearing against the under side of the door and mechanism for moving said shaft to open and close the door.

17. In a dumping-car, a hinged door forming a part of the car-bottom, a supporting-arm pivotally connected to the car-frame beneath the door and movable to and from vertical position in engagement with the under side of the door to hold the door closed when in vertical position and supporting the door when in open position and means for turning the arm to permit the door to open when turned from vertical position.

18. In a dumping-car, a hinged door forming a part of the car-bottom, a supporting-arm pivotally connected to the car-frame beneath the door and movable to and from vertical position in engagement with the under side of the door to hold the door closed when in vertical position and permit the door to open and support it in open position when turned from vertical position.

In testimony whereof I have signed this specification in the presence of two subscribing witnesses.

ANTON BECKER.

Witnesses:
FOREST R. GREEN,
W. D. MCKINNEY.